(12) United States Patent
Hashimoto et al.

(10) Patent No.: US 7,725,805 B2
(45) Date of Patent: May 25, 2010

(54) METHOD AND INFORMATION APPARATUS FOR IMPROVING DATA RELIABILITY

(75) Inventors: Akiyoshi Hashimoto, Kawasaki (JP); Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1072 days.

(21) Appl. No.: 11/386,939

(22) Filed: Mar. 23, 2006

(65) Prior Publication Data
US 2007/0186141 A1    Aug. 9, 2007

(30) Foreign Application Priority Data
Feb. 3, 2006    (JP) .............. 2006-026670

(51) Int. Cl.
*G11C 29/00*    (2006.01)
(52) U.S. Cl. .................. 714/763; 365/185.09
(58) Field of Classification Search .......... 714/752, 714/763
See application file for complete search history.

(56) References Cited

U.S. PATENT DOCUMENTS 5,581,715 A * 12/1996 Verinsky et al. ............. 714/48
6,609,181 B2 * 8/2003 James et al. ................ 711/156
6,785,077 B2 * 8/2004 Lim et al. ..................... 360/53
7,124,217 B2 * 10/2006 Verinsky et al. .............. 710/62
2005/0036371 A1 * 2/2005 Kushida .................... 365/201

FOREIGN PATENT DOCUMENTS

| JP | 2004-530964 | 10/2004 |
| JP | 2005-084799 | 3/2005 |
| WO | 02/057918 A2 | 7/2002 |

* cited by examiner

*Primary Examiner*—Esaw T Abraham
(74) *Attorney, Agent, or Firm*—Brundidge & Stanger, P.C.

(57) ABSTRACT

Reliability of data that is stored in a disk drive by a storage system is enhanced. An information apparatus has a processor, a memory, an interface control unit, and a system control unit, which controls communications between the processor, the memory, and the interface control unit. The system control unit judges whether to attach, to data that is transferred between the memory and the system control unit, an error detecting code for protecting the data based on an address in the memory at which the data to be transferred is read or written.

17 Claims, 14 Drawing Sheets

| HEAD ADDRESS | RANGE | ATTRIBUTE | | | |
|---|---|---|---|---|---|
| | | MEMORY WRITE | | MEMORY READ | |
| | | BLOCK CHECK CHARACTER GENERATION | BLOCK CHECK CHARACTER CHECKING | BLOCK CHECK CHARACTER GENERATION | BLOCK CHECK CHARACTER CHECKING |
| 0x00000000 | 512MB | 0 | 00 | 0 | 00 |
| 0x20000000 | 512MB | 1 | 00 | 0 | 00 |
| 0x40000000 | 512MB | 0 | 10 | 0 | 00 |
| 0x60000000 | 512MB | 0 | 11 | 0 | 00 |
| ⋮ | ⋮ | ⋮ | ⋮ | ⋮ | ⋮ |

METHOD AND INFORMATION APPARATUS FOR IMPROVING DATA RELIABILITY

CLAIM OF PRIORITY

The present application claims priority from Japanese application JP2006-026670 filed on Feb. 3, 2006, the content of which is hereby incorporated by reference into this application.

BACKGROUND

The technology disclosed in this specification relates to an improvement of reliability of data processed by information apparatus, and more specifically, to a control in attaching and checking an error detecting code for data protection.

The recent miniaturization and speeding up of the semiconductor manufacturing process technology has raised the risk of data corruption in semiconductor products. Accordingly, increased importance is now placed on technologies that enhance data reliability.

Under this situation, data is protected through various methods. In a case where computer systems communicate with one another via a LAN, for example, data is protected over the LAN by TCP checksum and Ethernet CRC, or the like. Over buses inside the computer systems, data is protected by a parity of a system bus. Data stored in a memory and a hard disk drive (HDD) inside an information apparatus is protected by error correcting codes (ECCs) (see JP 2004-530964 A and JP 2005-84799 A, for example).

SUMMARY

In the conventional information apparatus described above, to write data from the information apparatus' memory (main storage) to HDD, the data is first transferred from the memory through the system bus to a host bus adapter that controls the HDD. Receiving the data, the host bus adapter removes the parity of the system bus from the received data, attaches an error detecting code that meets the standard of an HDD interface to the data, and then transfers the data to the HDD via the HDD interface. The HDD removes from the received data the error detecting code that meets the standard of the HDD interface, attaches an within-HDD error detecting code, and writes the data in a recording medium inside the HDD.

Since the error detecting code is removed once in the host bus adapter, there is a section in which the data is not protected against errors unless the host bus adapter has a data protection function. In the case where a data error occurs in the host bus adapter that does not have a data protection function, the data is written in the HDD with the error undetected.

Attaching an error detecting code to data in the memory and storing the data in HDD as it is enable the information apparatus to detect data error that occurs in the adapter. There are several possible ways to this end. One example thereof is to have a processor of the apparatus attach an error detecting code such as a checksum to data in the memory. A drawback of this method is that the performance of the information apparatus is lowered apparently since the processor has to do more computation. Another example is to mount a DMA engine to a system controller that controls the memory as well as data transfer in the information apparatus and to have the DMA engine generate and check an error detecting code during data transfer. This method, however, is not much compatible with conventional systems in which a LAN controller connected to the LAN and a host bus adapter connected to the HDD execute data transfer. Furthermore, data stored in the memory includes a program which is not the subject of data protection and control data used by the program in addition to user data which has to be protected by an error detection code. It is therefore necessary to select whether to generate and check an error detection code in accordance with the type of data.

According to a representative aspect of this invention, there is provided an information apparatus characterized by including: a processor; a processor bus to which the processor is coupled; a memory; a memory bus to which the memory is coupled; at least one interface control unit; a system bus to which the interface control unit is coupled; and a system control unit coupled to the processor bus, the memory bus, and the system bus to control communications between the processor, the memory, and the interface control unit, and characterized in that the system control unit judges whether to attach, to data that is transferred between the, memory and the system control unit, an error detecting code for protecting the data based on an address in the memory at which the data to be transferred is read or written.

This invention eliminates from a data transfer path in an information apparatus a section in which no error detecting code is attached, and thus protects data all the way along the path.

DETAILED DESCRIPTION OF THE PREFERRED EMBODIMENTS

An embodiment of this invention will be described below with reference to the accompanying drawings.

Figure 1:
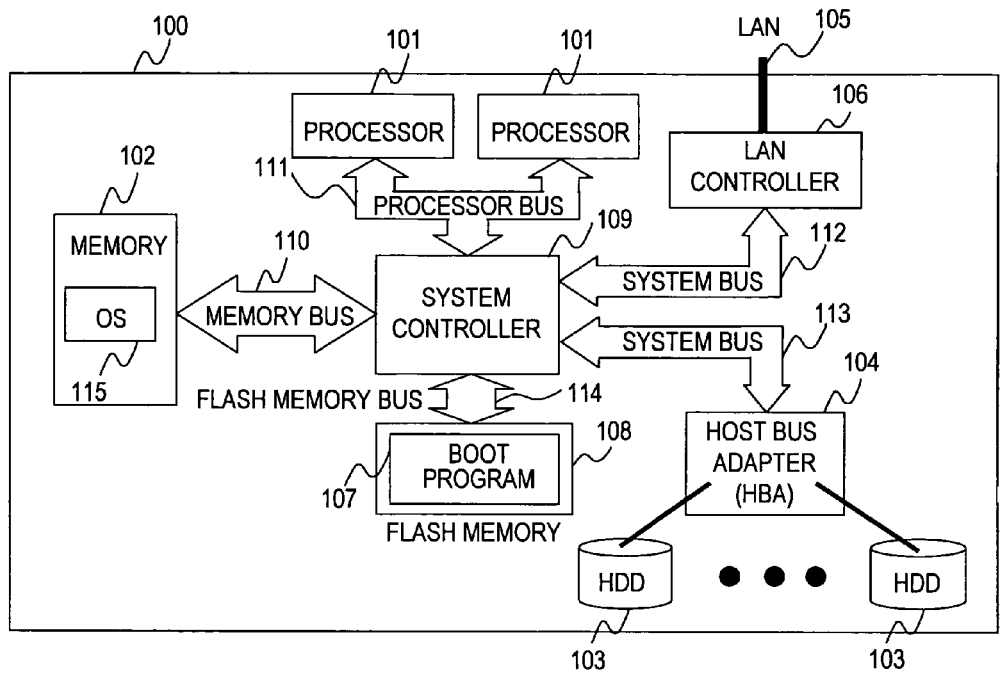
FIG. 1 is a block diagram showing the configuration of an information apparatus according to an embodiment of this invention.

FIG. 1 is a block diagram showing the configuration of an information apparatus according to the embodiment of this invention.

This invention is applicable to various types of information apparatus connected to a diversity of communication networks. The following description takes as an example a case in which the information apparatus is a storage system (network-attached storage system) and a local area network (LAN) serves as a communication network connected to the information apparatus. Instead of a LAN, the communication network of this embodiment can be a storage area network (SAN), an Infiniband (Trademark) network, a WAN (Wide Area Network), the Internet, or any other communication networks that connect computers. The information apparatus of this embodiment may be a general-purpose computer, a personal computer, or the like.

The information apparatus of this embodiment is connected to a LAN 105. The information apparatus 100 has a processor 101, a memory 102, a hard disk drive (HDD) 103, a host bus adapter (HBA) 104, a LAN controller 106, a flash memory 108, a system controller 109, a memory bus 110, a processor bus 111, a system bus 112, a system bus 113 and a flash memory bus 114. The HBA 104 and the LAN controller 106 may be integrated into one control unit. The system bus 112 and the system bus 113 may be integrated into one system bus.

The processor 101 executes programs stored in the memory 102 and the flash memory 108. The processor 101 is connected to the system controller 109 via the processor bus 111. FIG. 1 shows two processors 101, but the information apparatus 100 of this embodiment can have only one processor 101, or three or more processors 101.

The memory 102 stores programs executed by the processor 101. Specifically, the memory 102 stores at least an operating system (OS) 115.

The memory 102 also stores data written in the HDD 103 and data read out of the HDD 103. The memory 102 is connected to the system controller 109 via the memory bus 110.

The HDD 103 is a non-volatile storage medium to store data written by a host computer (not shown) that is connected to the LAN 105. An example of the non-volatile storage medium is an HDD. The information apparatus 100 of this embodiment may have a plurality of HDDs 103. The plurality of HDDs 103 may constitute redundant arrays of inexpensive disks (RAID). Each HDD 103 is connected to the HBA 104.

The HBA 104 controls the HDD 103. The HBA 104 is connected to the system controller 109 via the system bus 113.

The LAN 105 is a network connected to the information apparatus 100 of this embodiment and to one or more host computers (not shown).

The LAN controller 106 is connected to the LAN 105 to control communications between the information apparatus 100 and a host computer. The LAN controller 106 is connected to the system controller 109 via the system bus 112.

The flash memory 108 is a non-volatile memory to store a boot program 107, which is executed by the processor 101. The flash memory 108 is connected to the system controller 109 via the flash memory bus 114.

The boot program 107 is a program that the processor 101 executes first after the information apparatus 100 is powered on.

The system controller 109 is a semiconductor device that controls data communications between the components of the information apparatus 100.

Figure 2:
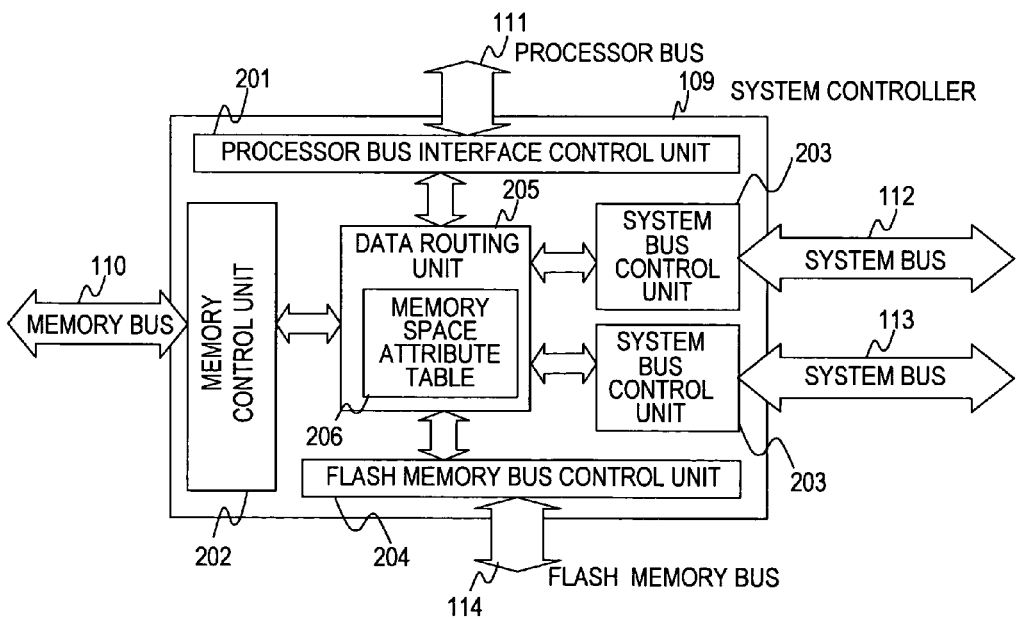
FIG. 2 is a block diagram showing the configuration of a system controller according to the embodiment of this invention.

FIG. 2 is a block diagram showing the configuration of the system controller 109 according to the embodiment of this invention.

The system controller 109 of this embodiment has a processor bus interface control unit 201, a memory control unit 202, two system bus control units 203, a flash memory bus control unit 204 and a data routing unit 205.

The processor bus interface control unit 201 is connected to the processor bus 111 to control communications between the processor 101 and the system controller 109.

The memory control unit 202 is connected to the memory bus 110 to control data written in and read out of the memory 102.

One of the two system bus control units 203 is connected to the system bus 112 to control communication between the LAN controller 106 and the system controller 109. The other system bus control unit 203 is connected to the system bus 113 to control communication between the HBA 104 and the system controller 109. In the case where the system bus 112 and the system bus 113 are integrated into one bus, the system bus control units 203 can be constructed as a single unit.

The flash memory bus control unit 204 is connected to the flash memory bus 114 to control reading of the boot program 107 out of the flash memory 108.

The data routing unit 205 controls data transfer between the units inside the system controller 109. The data routing unit 205 has an internal memory which holds an address space attribute table 206. The address space attribute table 206, which, in the example of FIG. 2, is kept in the data routing unit 205, may be held by any unit in the system controller 109 in practice. Details of the address space attribute table 206 will be described later with reference to FIGS. 3 and 4.

Figures 3, 4:
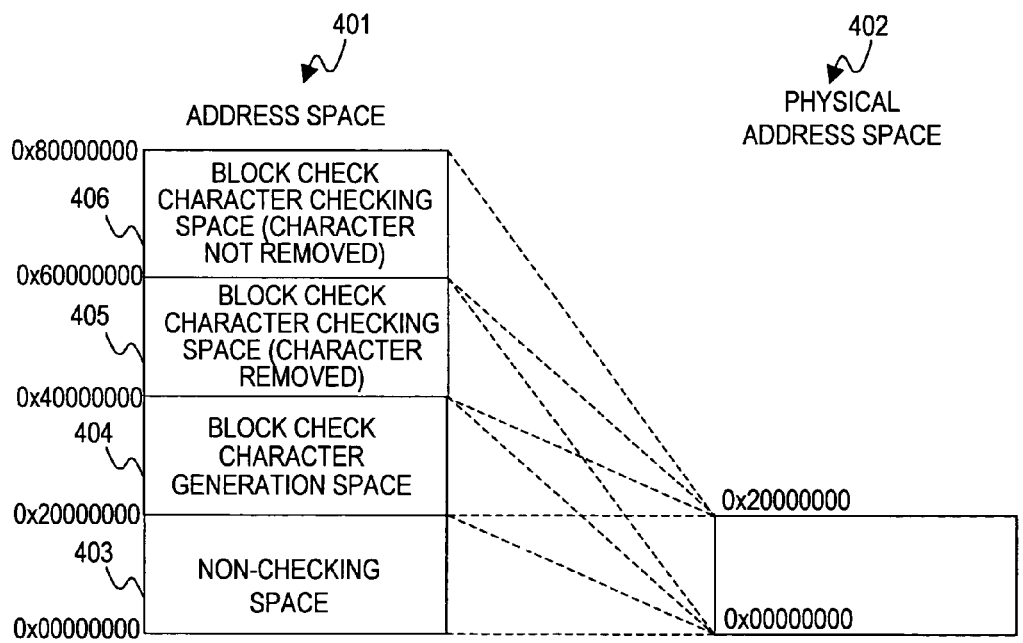
FIG. 3 is an explanatory diagram of an address space attribute table according to the embodiment of this invention.
FIG. 4 is an explanatory diagram of an address space in a memory according to the embodiment of this invention.

FIG. 3 is an explanatory diagram of the address space attribute table 206 according to the embodiment of this invention. The address space attribute table 206 of this embodiment is a table used to manage attributes assigned to spaces within the memory 102. Those attributes will be described later.

A head address 301 indicates an address at the head of each area defined in an address space of the memory 102. Details of address spaces in the memory 102 will be described later with reference to FIG. 4. An address space in the memory 102 of this embodiment is divided into four areas, which are given as the head address 301 "0x00000000" (a row 307), "0x20000000" (a row 308), "0x40000000" (a row 309), and "0x60000000" (a row 310), respectively. In other words, the rows 307 to 310 correspond to the areas beginning at the respective head addresses that are registered as the head address 301.

A range 302 indicates the range of each area counted in bytes. Every area in this embodiment has 512 megabytes (MB) as the range 302.

An attribute (303 to 306) is information assigned to each area, and indicates whether to generate an error detecting code and whether to check an error detecting code in executing data write or data read in the memory 102. This embodiment takes block check character as an example of error detecting code (a description will be given later with reference to FIG. 6). This invention is not dependent on the type of error detecting code. Error correcting code may be used instead of error detecting code.

A description will be given on what meaning each attribute value has when one of areas managed with the address space attribute table 206 is designated in executing data write or data read.

In the case where a value "1" is written in a cell for a memory write block check character generation field 303 in a row that corresponds to the designated area, a block check character is generated when data is written in the memory 102 and the generated block check character is attached to the data.

In the case where a value "1" is written in a cell for a memory read block check character, generation field 305 in a row that corresponds to the designated area, a block check character is generated when data is read out of the memory 102 and the generated block check character is attached to the data.

2-bit numerical values are stored in block check character checking fields 304 and 306. The most significant bit (the left-hand side number of a 2-bit numerical value written in the field 304 or 306 in FIG. 3) indicates whether to check a block check character. In this embodiment, "1" registered as the most significant bit means that a block check character is to be checked whereas "0" registered as the most significant bit means that a block check character is not to be checked. The least significant bit (the right-hand side number of a 2-bit numerical value written in the field 304 or 306 in FIG. 3) indicates whether to remove a block check character after the block check character is checked. In this embodiment, "1" registered as the least significant bit means that a block check character is not to be removed whereas "0" registered as the least significant bit means that a block check character is to be removed. There is no need for the system controller 109 to judge whether to remove a block check character when the block check character is not to be checked. Accordingly, in the case where "0" is registered as the most significant bit, the operation of the system controller 109 is not influenced by the least significant bit whichever value ("0" or "1") the less significant bit takes.

When the memory write block check character checking field 304 in the row that corresponds to the designated area has a value "10", a block check character is checked in writing data in the memory 102 and the block check character is removed from the data.

When the memory write block check character checking field 304 in the row that corresponds to the designated area has a value "11", a block check character is checked in writing data in the memory 102, but the block check character is not removed from the data.

When the memory read block check character checking field 306 in the row that corresponds to the designated area has a value "10", a block check character is checked in reading out data in the memory 102 and the block check character is removed from the data.

When the memory read block check character checking field 306 in the row that corresponds to the designated area has a value "11", a block check character is checked in reading out data in the memory 102, but the block check character is not removed from the data.

FIG. 3 shows as an example only four rows 307 to 310, but the address space attribute table 206 can have more rows. For instance, the address space attribute table 206 may have a row in which "1" is written in the memory read block check character generation field 305, and a row in which "10" is written in the memory read block check character checking field 306.

The above attributes are consulted by the system controller 109 upon reception of an address and a command. Processing executed by the system controller 109 will be described later in detail with reference to FIG. 10 and other drawings.

FIG. 4 is an explanatory diagram of an address space in the memory 102 according to the embodiment of this invention.

FIG. 4 shows the association between an address space 401 and a physical address space 402.

The physical address space 402 is an actual address space in the memory 102. In the example of FIG. 4, a 512-MB space beginning at an address "0x00000000" and ending at an address "0x20000000" is secured as the physical address 402.

Each address belonging to the address space 401 is associated with one of addresses in the physical address space 402. The address space 401 is additionally divided into a plurality of address spaces, each of which has an address associated with an address in the physical address space 402.

In the example of FIG. 4, the address space 401 is divided into four spaces, which are mapped over the physical address space 402 in an overlapping manner. Specifically, a 512-MB non-checking space 403 in the address space 401 that has addresses equal to or larger than "0x00000000" and smaller than "0x20000000" is mapped over the 512-MB space in the physical address space 402 that has addresses equal to or larger than "0x00000000" and smaller than "0x20000000". The non-checking space 403 corresponds to the row 307 in FIG. 3.

Similarly, a block check character generation space 404 in the address space 401 that has addresses equal to or larger than "0x20000000" and smaller than "0x40000000", a block check character checking (character removed) space 405 in the address space 401 that has addresses equal to or larger than "0x40000000" and smaller than "0x60000000", and a block check character checking (character not removed) space 406 in the address space 401 that has addresses equal to or larger than "0x60000000" and smaller than "0x80000000" are mapped over the 512-MB space in the physical address space 402 that has addresses equal to or larger than "0x00000000" and smaller than "0x20000000". The spaces 404 to 406 correspond to the rows 308 to 310, respectively, in FIG. 3.

For example, an address "0x30000000" in the address space 401 is mapped at an address "0x10000000" in the physical address space 402. This means that data written in the address space 401 at the address "0x30000000" is actually stored at the address "0x10000000" in the physical address space 402 of the memory 102. Since the address "0x30000000" in the address space 401 belongs to the block check character generation space 404, a block check character is generated for this data, and the generated block check character is written in the memory 102 along with the data as shown in the row 308 of FIG. 3.

FIG. 4 shows four address spaces 403 to 406 corresponding to the four rows 307 to 310 of FIG. 3. When the table in FIG. 3 has more than four rows, as many address spaces as the rows may be provided.

In the example shown in FIG. 4, the spaces 403 to 406 in the address space 401 are mapped over the physical address space 402 in an overlapping manner. Alternatively, more than one physical address space 402 may be prepared to correspond to spaces in the address space 401 on a one-to-one basis.

Figure 5:
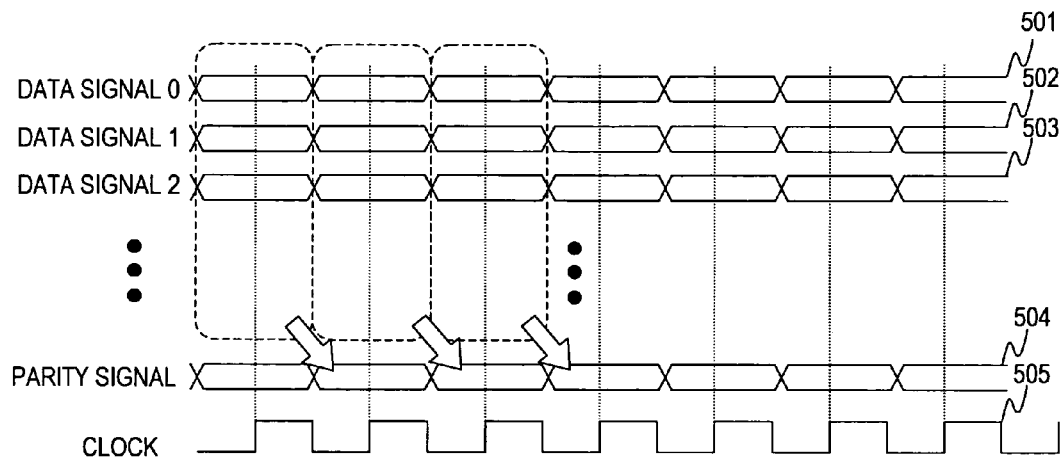
FIG. 5 is an explanatory diagram of a parity attached to data.
Figure 6:
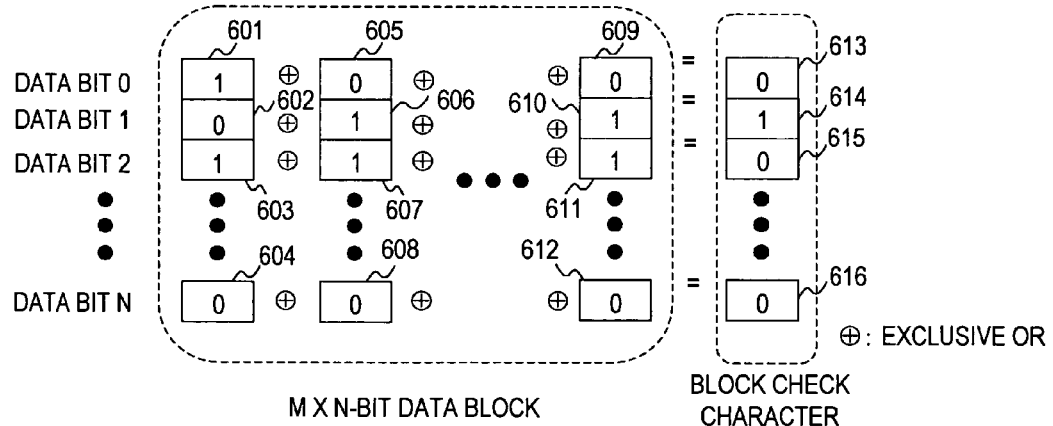
FIG. 6 is an explanatory diagram of a block check character according to the embodiment of this invention.

The description given next with reference to FIGS. 5 and 6 is about a parity and a block check character which are attached to data in order to protect the data.

FIG. 5 is an explanatory diagram of a parity attached to data.

A timing chart of FIG. 5 shows a data signal 501 and other data signals driven by a single clock 505 in relation to a parity signal 504, and shows time along its horizontal axis. A data signal 0 to a data signal 2 (data signals 501 to 503) are each 1-bit data. When the data bit width is M bits (M is a natural number that is arbitrarily chosen), not-shown data signals 3 to M-1 are included.

The parity signal 504 is a bit generated by performing, at each timing, a given arithmetic operation on the data signals 501, 502 . . . throughout the entire data bit width (one area bordered by the dotted lines in FIG. 5). The given arithmetic operation is, for example, exclusive OR.

The parity signal 504 generated from the data signals 501, 502 . . . in one clock cycle is transmitted in sync with the next clock cycle.

In the case where error occurs in one of bits of the data signals 501, 502 . . . after a parity is attached, it creates a discrepancy between the data signals 501, 502 . . . and the associated parity signal 504. To give an example, in the case where the given arithmetic operation is exclusive OR, error in one of the bits of the data signals gives "1" as the exclusive OR of the data signals 501, 502 . . . and the parity signal 504 when it should be "0". Error in the data signal 501 or other data signals is thus detected.

FIG. 6 is an explanatory diagram of a block check character according to the embodiment of this invention.

A block check character is generated by arranging data bits two-dimensionally and executing a given arithmetic operation for each row (or column). In the example of FIG. 6, data bits 601, 602, 603 . . . (M bits×N bits in total) are arranged two-dimensionally, and exclusive OR is performed on bits in each row to thereby generate block check characters 613, 614, 615, . . . 616. In short, block check characters are error detecting codes attached to an M×N-bit data block.

As is the case for the parity shown in FIG. 5, error in one of the data bits 601, 602 . . . creates a discrepancy between the data bits 601, 602 . . . and the block check characters 613, 614 . . . , which makes it possible to detect error in the data bit 601 or other data bits.

Next, data protection will be described with reference to FIGS. 7 and 8.

Figure 7:
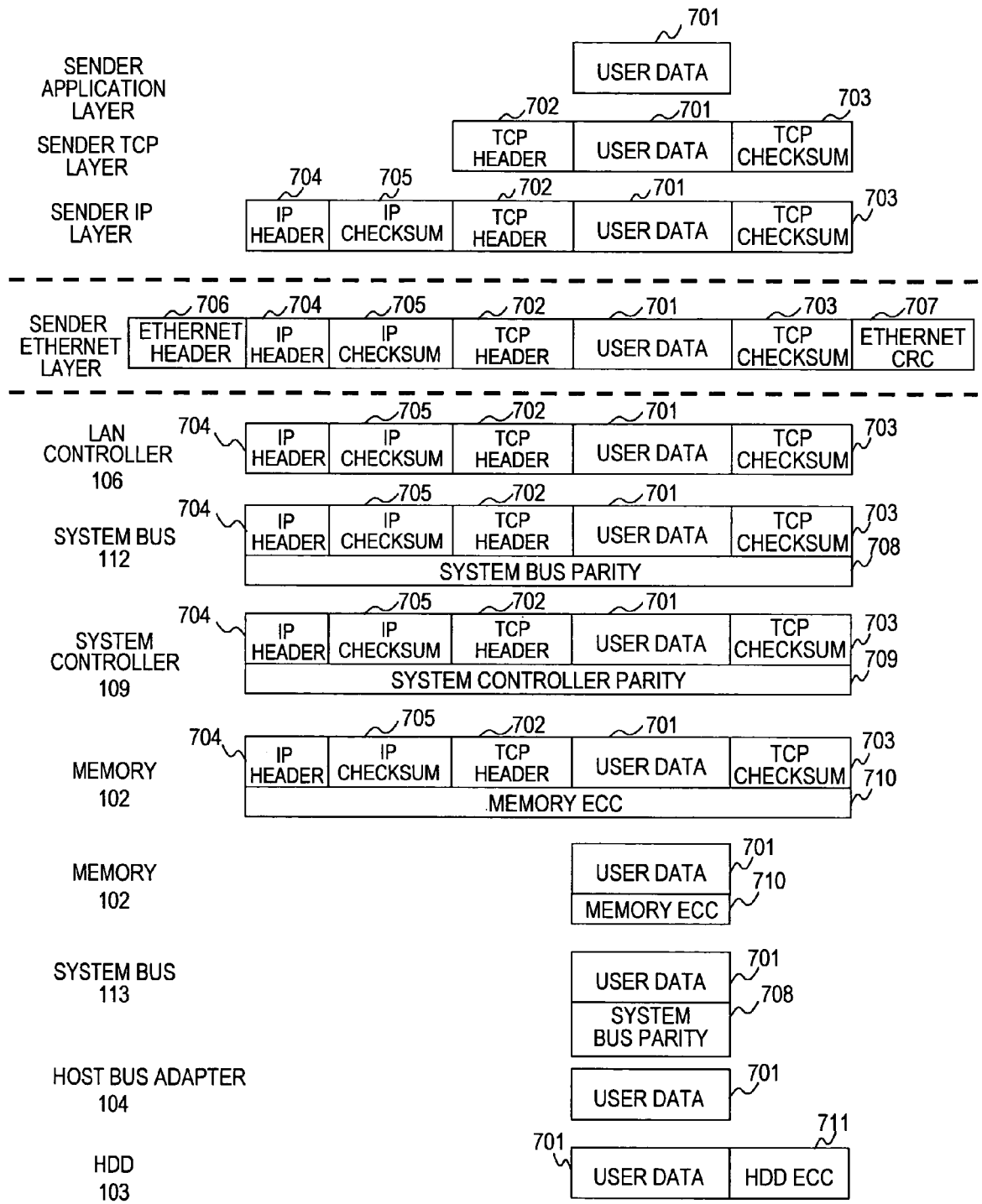
FIG. 7 is an explanatory diagram of data protection according to prior art.

FIG. 7 is a diagram illustrating data protection in the respective components of the information apparatus shown in FIG. 1 when prior art is applied to the information apparatus.

The following description takes as an example a case in which a host computer (not shown) connected to the LAN 105 writes user data in the information apparatus via the LAN 105.

User data 701 in a transmission control protocol (TCP) layer has a TCP segment, which is generated by attaching a TCP header 702 and a TCP checksum 703 to the user data 701 in an application layer of the host computer. The TCP checksum 703 is an error detecting code for detecting error in the user data 701. In other words, the user data 701 at this point is protected by the TCP checksum 703.

Next, in an internet protocol (IP) layer, an IP header 704 and an IP checksum 705 are attached to the TCP segment to thereby generate an IP packet. The IP checksum 705 is an error detecting code for protecting the IP header 704.

Next, an Ethernet header 706 and an Ethernet cyclic redundancy check code (CRC) 707 are added to the IP packet, to thereby generate an Ethernet packet. The Ethernet packet is sent out of the host computer to a cable (not shown) constituting the LAN. The Ethernet CRC 707 is an error detecting code for detecting error in the Ethernet packet.

Receiving the Ethernet packet, the LAN controller 106 of the information apparatus 100 takes the IP packet out of the Ethernet packet, attaches a system bus parity 708 to the data, and sends the data to the system bus 112. The system bus parity 708 is a parity for detecting data error that occurs in the system bus 112.

Receiving the IP packet from the LAN controller 106, the system controller 109 removes the system bus parity 708 and newly attaches a system controller parity 709. The system controller parity 709, too, is a parity for detecting error in data.

The data received by the system controller 109 is transferred to and stored-in the memory 102 via the memory bus 110. In storing the IP packet data in the memory, a memory error correcting code (ECC) 710 is newly attached to the data. The IP packet further receives TCP processing and IP processing executed by the OS 115 to check, and remove from the IP packet, the IP header 704, the IP checksum 705, the TCP header 702, and the TCP checksum 703. As a result, the user data 701 and the memory ECC 710 attached to the user data 701 are stored in the memory 102.

Thereafter, the user data 701 stored in the memory 102 is transferred to the HBA 104 via the memory bus 110, the system controller 109 and the system bus 113. The system bus parity 708 is attached to the user data 701 over the system bus 113.

The HBA 104 removes the system bus parity 708 from the user data 701. This leaves the data unprotected by any error detecting codes.

The HDD 103 attaches an HDD ECC 711 to the user data 701 and stores the data in a disk (not shown).

As has been described, prior art allows data that is being transmitted from the HBA 104 to the HDD 103 to be unprotected by error detecting codes. In other words, prior art is not capable of detecting data error that occurs between the HBA 104 and the HDD 103.

Figure 8:
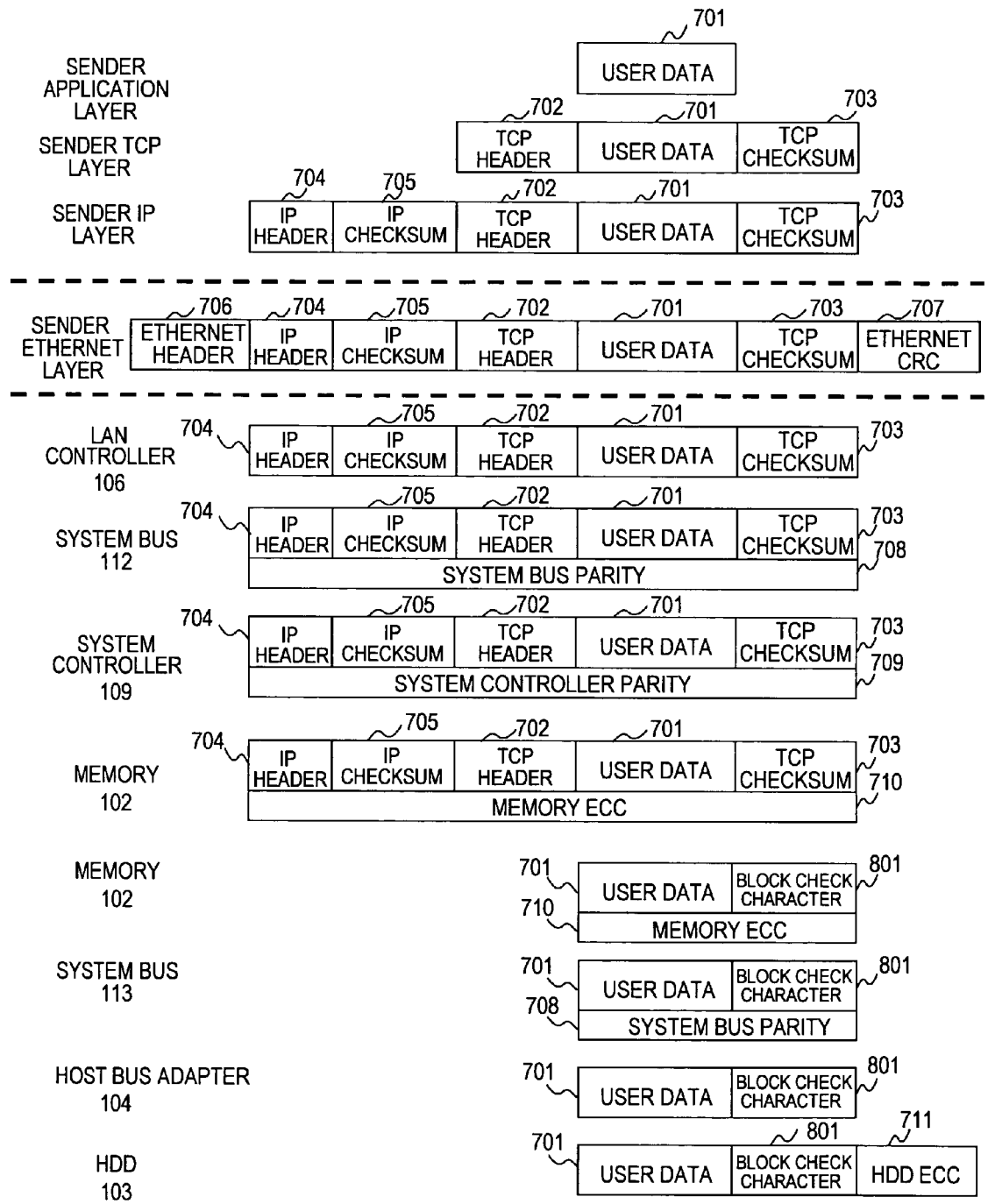
FIG. 8 is an explanatory diagram of data protection according to the embodiment of this invention.

FIG. 8 is an explanatory diagram of data protection according to the embodiment of this invention.

FIG. 8 is the same as FIG. 7 until data sent from a host computer that is connected to the LAN 105 is stored in the memory 102, and a description on this part of FIG. 8 will be omitted. Also, what is common to FIGS. 7 and 8 in the following description will not be described in detail.

After the OS 115 removes the headers and the checksums from the IP packet stored in the memory 102, a block check character 801 is attached to the user data 701. This block check character 801 corresponds to the block check characters 613 to 616 of FIG. 6.

The system bus parity 708 is attached to the user data 701 and the block check character 801 over the system bus 113.

The HBA 104 removes the system bus parity 708. At this point, the block check character 801 remains attached to the user data 701. The HBA 104 sends the user data 701 along with the block check character 801 to the HDD 103.

The HDD 103 attaches the HDD ECC 711 to the user data 701 and to the block check character 801 before storing them in a disk.

As described, according to this embodiment, the user data 701 written by a host computer in the HDD 103 via the LAN 105 is protected at any point along the path by at least one of error detecting codes including checksums, a CRC, parities, ECCs and the block check character 801.

However, the memory 102 stores not only user data to be written in the HDD 103 but also program data, which does not need protection provided by attaching the block check character 801. In this embodiment, the block check character 801 is attached only to data that needs protection as will be described later in detail.

Processing executed by the information apparatus 100 of this embodiment will be described next with reference to flowcharts.

Figure 9:
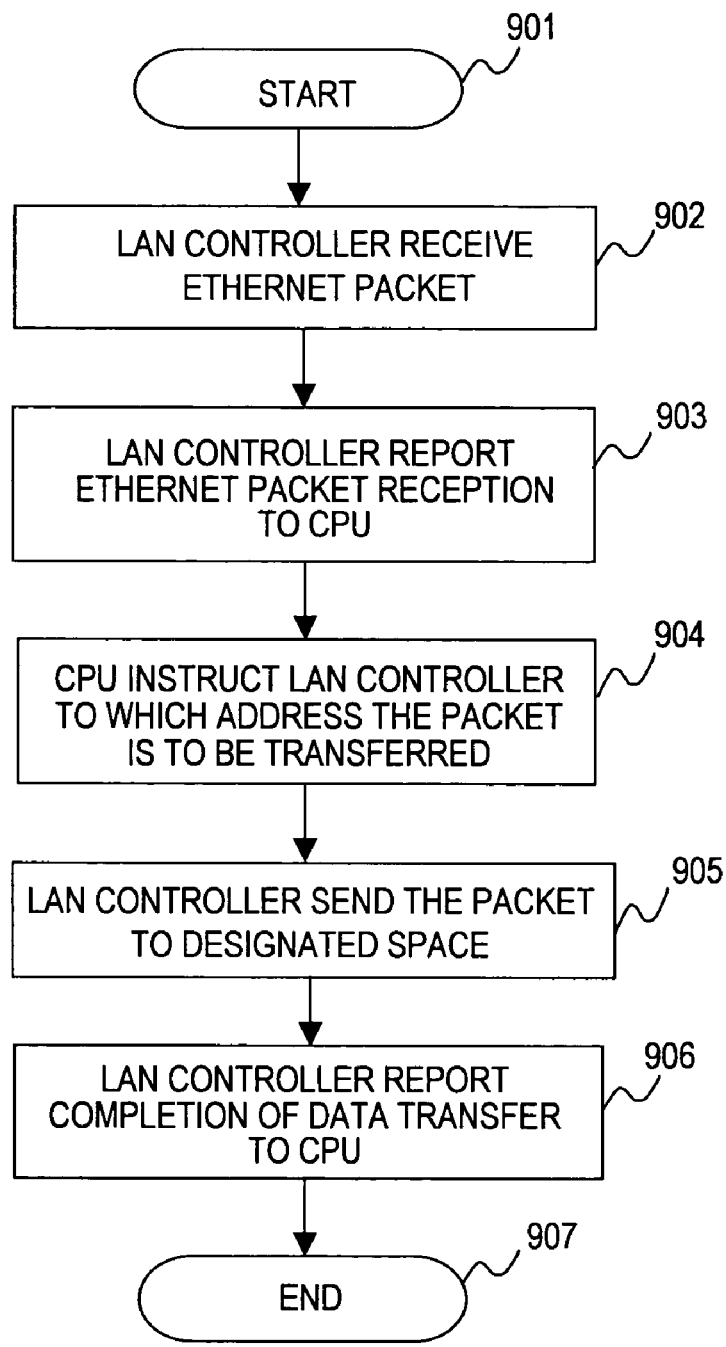
FIG. 9 is a flowchart showing processing that is executed when data is received by a LAN controller according to the embodiment of this invention.

FIG. 9 is a flowchart showing processing that is executed when data is received by the LAN controller 106 according to the embodiment of this invention.

As the processing is started (901), the LAN controller 106 receives an Ethernet packet (902). The LAN controller 106 reports the reception of the Ethernet packet to the processor 101 (903).

Receiving the report, the processor 101 gives a command to the LAN controller 106 about to which address in the memory 102 the received Ethernet packet is to be transferred (904). Specifically, the processor 101 selects one of addresses belonging to the address space 401 and sends the address to the LAN controller 106.

In the case where the received Ethernet packet is composed of program data, for example, there is no need to attach the block check character 801 to the received data. Then the processor 101 selects one of addresses within the non-checking space 403 to send. On the other hand, when the received Ethernet packet is user data instead of program data, the block check character 801 has to be attached to the received data. Then the processor 101 selects one of addresses within the block check character generation space 404 to send.

Similarly, when it is necessary to check the block check character 801 attached to the received data and remove the block check character 801 thereafter, the processor 101 selects one of addresses within the block check character checking space (character removed) 405 to send. In the case where the block check character 801 is to remain attached to the received data after checking the block check character 801, the processor 101 selects one of addresses within the block check character checking space (character not removed) 406 to send.

To be able to select an appropriate address in Step 904, the processor 101 must determine the type of data contained in the received Ethernet packet.

For instance, the LAN controller 106 may analyze a packet and send information on the type of data contained in the packet to the processor 101, thereby enabling the processor 101 to determine the type of data from the information.

Alternatively, the processor 101 may give a command to transfer all data to the non-checking space 403 once. In this case, the processor 101 may execute packet analysis to determine the type of the data and move the data to one of the spaces in accordance with the identified data type.

As another option, the processor 101 may execute packet analysis before the data is transferred to determine the type of the data and designate to which address the data is to be transferred in accordance with the identified data type.

As yet another option, the processor 101 may designate to which address the data is to be transferred in accordance with attribute information that is contained for data type identification in a communication protocol used in the LAN controller 106.

Next, the LAN controller 106 sends the packet to the address belonging to the address space that is designated in Step 904 (905). The system controller 109 receives the packet and writes the received packet at the designated address in the memory 102. At this point, the system controller 109 generates or checks the block check character in accordance with the attributes of the address space to which the designated address belongs as shown in FIGS. 3 and 4.

The LAN controller 106 then sends a data transfer completion report to the processor 101 (906).

This completes the processing (907).

Figure 10:
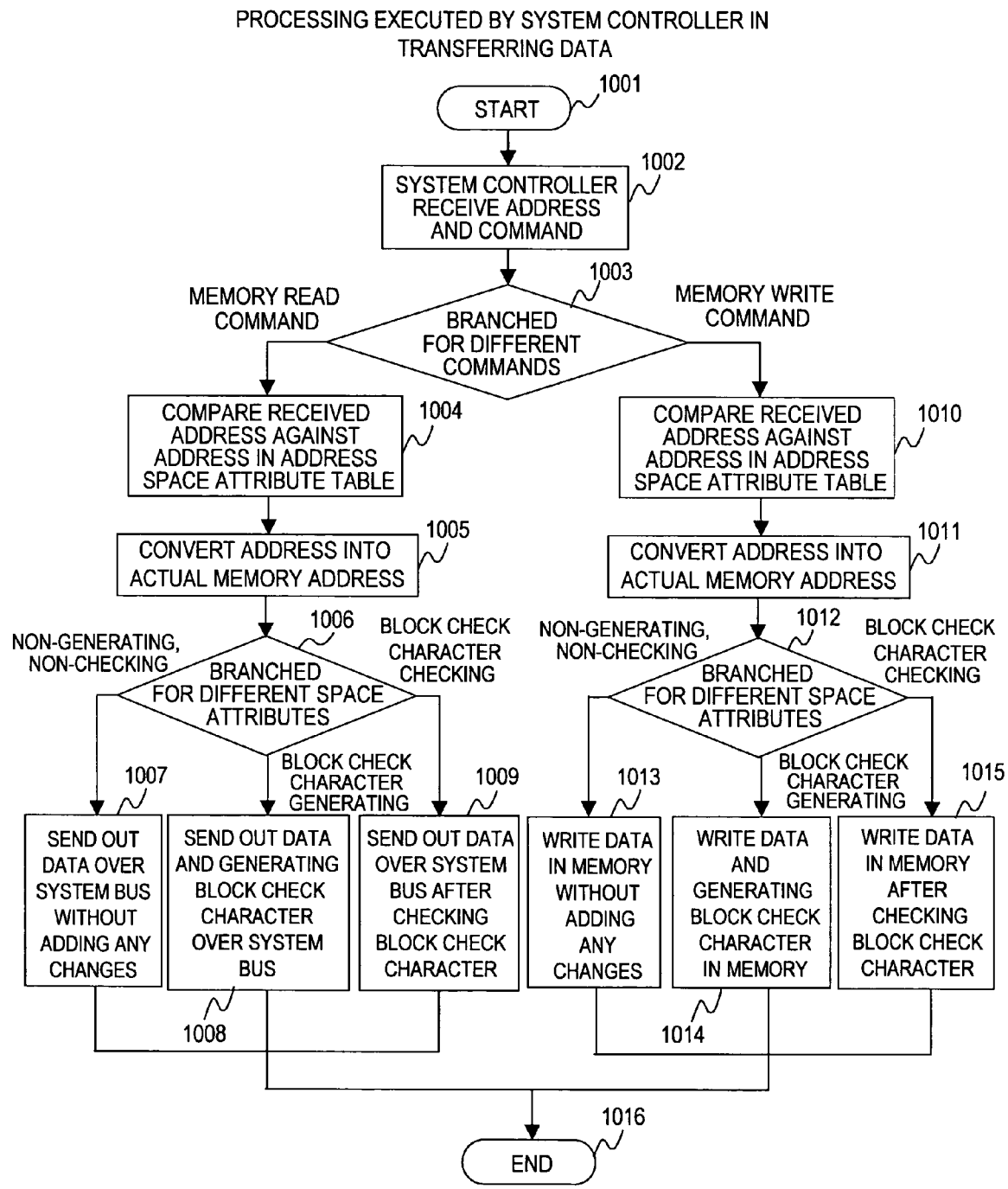
FIG. 10 is a flowchart showing processing that is executed when data is transferred by the system controller according to the embodiment of this invention.

FIG. 10 is a flowchart showing processing that is executed when data is transferred by the system controller 109 according to the embodiment of this invention.

As the processing is started (1001), the system controller 109 receives an address and a command from the LAN controller 106 or from the HBA 104 (1002). The system controller 109 determines the type of the received command (1003). The address here is an address within the address space 401 of the memory 102 that is designated by the processor 101 and sent to the LAN controller 106 or to the HBA 104. The command here is a read command to read data out of the memory 102, or a write command to write data in the memory 102.

Judging in Step 1003 that the received command is a read command for data in the memory 102, the system controller 109 compares the received address against addresses in the address space attribute table 206 (1004).

The system controller 109 next converts the received address into an address in the physical address space 402 that is mapped at the received address (1005).

The system controller 109 then determines the attributes of the address space 401 (1006). Specifically, the system controller 109 determines, based on the comparison in Step 1004, what attributes are possessed by a space in the address space 401 to which the address received from the LAN controller 106 or from the HBA 104 belongs. The system controller 109 uses the identified attributes to judge whether or not the block check character 801 is to be generated, or whether or not the block check character 801 is to be checked.

In the case where the system controller 109 judges in Step 1006 that the received address belongs to the non-checking space 403, there is no need to generate or check the block check character 801. Then the system controller 109 sends out the data stored in the memory 102 at the address in the physical address space 402 that has been converted in Step 1005 over the system bus 112 or 113 without adding any changes to the data (1007).

In the case where the system controller 109 judges in Step 1006 that the received address belongs to the block check character generation space 404, the block check character 801 has to be created. Then the system controller 109 reads the data stored in the memory 102 at the address in the physical address space 402 that has been converted in Step 1005. The system controller 109 also creates the block check character 801 to protect the read data. The read data and the created block check character 801 are sent out over the system bus 112 or 113 by the system controller 109 (1008).

In the case where the system controller 109 judges in Step 1006 that the received address belongs to the block check character checking space (character removed) 405 or the block check character checking space (character not removed) 406, the block check character 801 has to be checked. Then the system controller 109 reads the data stored in the memory 102 at the address in the physical address space 402 that has been converted in Step 1005. The system controller 109 checks the block check character 801 attached to the read data, and sends the data out over the system bus 112 or 113 (1009).

When the received address belongs to the block check character checking space (character removed) 405, the system controller 109 removes the block check character 801 that has been checked from the read data and sends out the data alone over the system bus 112 or 113 in Step 1009. When the received address belongs to the block check character checking space (character not removed) 406, the system controller 109 does not remove the block check character 801 that has been checked, and sends out the block check character 801 as well as the data over the system bus 112 or 113 in Step 1009.

Judging in Step 1003 that the received command is a write command for data in the memory 102, the system controller 109 compares the received address against addresses in the address space attribute table 206 (1010).

The system controller 109 next converts the received address into an address in the physical address space 402 that is mapped at the received address (1011).

The system controller 109 then determines the attributes of the address space 401, as in Step 1006, based on a comparison of Step 1010 (1012). The system controller 109 uses the identified attributes to judge whether or not the block check character 801 is to be generated, or whether or not the block check character 801 is to be checked.

In the case where the system controller 109 judges in Step 1012 that the received address belongs to the non-checking space 403, there is no need to generate or check the block check character 801. Then the system controller 109 writes the data in the memory 102 without adding any changes to the data (1013).

In the case where the system controller 109 judges in Step 1006 that the received address belongs to the block check character generation space 404, the block check character 801 has to be created. Then the system controller 109 creates the block check character 801 for protecting the data. The data and the created block check character 801 are written in the memory 102 by the system controller 109 (1014).

In the case where the system controller 109 judges in Step 1006 that the received address belongs to the block check character checking space (character removed) 405 or the block check character checking space (character not removed) 406, the block check character 801 has to be checked. Then the system controller 109 checks the block check character 801 attached to the data, and writes the data in the memory 102 (1015).

When the received address belongs to the block check character checking space (character removed) 405, the system controller 109 removes the block check character 801 that has been checked from the data and writes the data alone in the memory 102 in Step 1015. When the received address belongs to the block check character checking space (character not removed) 406, the system controller 109 does not remove the block check character 801 that has been checked. The data and the block check character 801 are written in the memory 102 by the system controller 109 in Step 1015.

In Steps 1013, 1014 and 1015, the system controller 109 writes the data (and the block check character 801) at an address in the memory 102 that corresponds to the address in the physical address space 402 that has been converted in Step 1005.

The system controller 109 ends the processing (1016) as Step 1007, 1008, 1009, 1013, 1014 or 1015 is completed.

Figure 11:
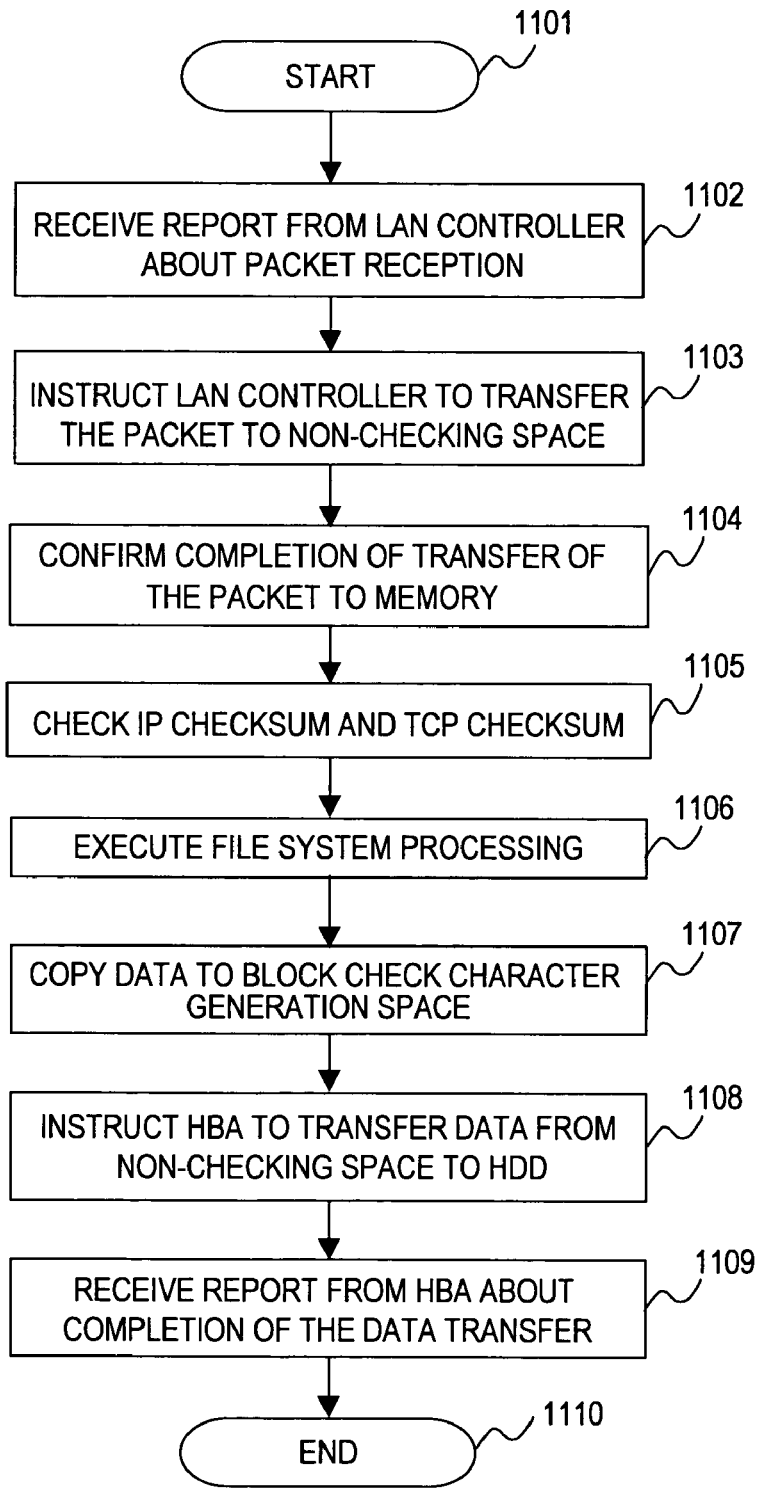
FIG. 11 is a flowchart showing processing that is executed by an OS when data from a host computer is received via a LAN by the information apparatus according to the embodiment of this invention.

FIG. 11 is a flowchart showing processing that is executed by the information apparatus 100 according to the embodiment of this invention when, following the processing of FIG. 9, the OS 115 transfers data received from a host computer to the HDD.

The OS 115 is a program stored in the memory 102 and executed by the processor 101. Therefore, processing executed by the OS 115 in the following description is actually executed by the processor 101.

As the processing is started (1101), the OS 115 receives from the LAN controller 106 a report about reception of a packet which is made in Step 903 of FIG. 9 (1102). The OS 115 commands the LAN controller 106 to transfer the received packet to the non-checking space 403 of the memory 102 (1103). The instruction sent from the OS 115 to the LAN controller 106 contains an address that is inside the non-checking space 403. The LAN controller 106 transfers the received packet to the non-checking space 403 of the memory 102. At this point, as shown in Step 1013 of FIG. 10, the system controller 109 writes the received packet in the memory 102 without adding any changes to the packet. The OS 115 is configured to command in this step a transfer to the non-checking space 403 since the OS 115 in general is not capable of judging whether received data is user data or not.

Next, the OS 115 confirms that the transfer of the received packet to the memory 102 has been completed (1104). This confirmation is made when the OS 115 confirms a report from the LAN controller 106.

The OS 115 next checks the IP checksum 705 and the TCP checksum 703 (1105).

The OS 115 then executes file system processing (1106). Through the file system processing, the packet is converted into a form that can be stored as data of a file in the HDD 103. Shown in FIG. 11 is processing of when the converted data is user data, not program data, in other words, processing of when the data needs protection by error detecting codes.

The OS 115 copies the converted data from the non-checking space 403 to the block check character generation space 404 (1107). A specific description will be given on this copy operation. The processor 101 sends the address of this data (that belongs to the non-checking space 403) and a read command to the system controller 109. Receiving the address, the system controller 109 transfers the data to the processor 101. The processor 101 sends a write command and an address (that belongs to the block check character generation space 404) to the system controller 109 in order to write the data in the block check character generation space 404. The processor 101 further sends the data to the system controller 109. After receiving the address and the write command, the system controller 109 receives the data from the processor, generates the block check character 801 for protecting the data, and writes the generated block check character 801 along with the data in the memory 102 as shown in Step 1014 of FIG. 10.

Figure 12:
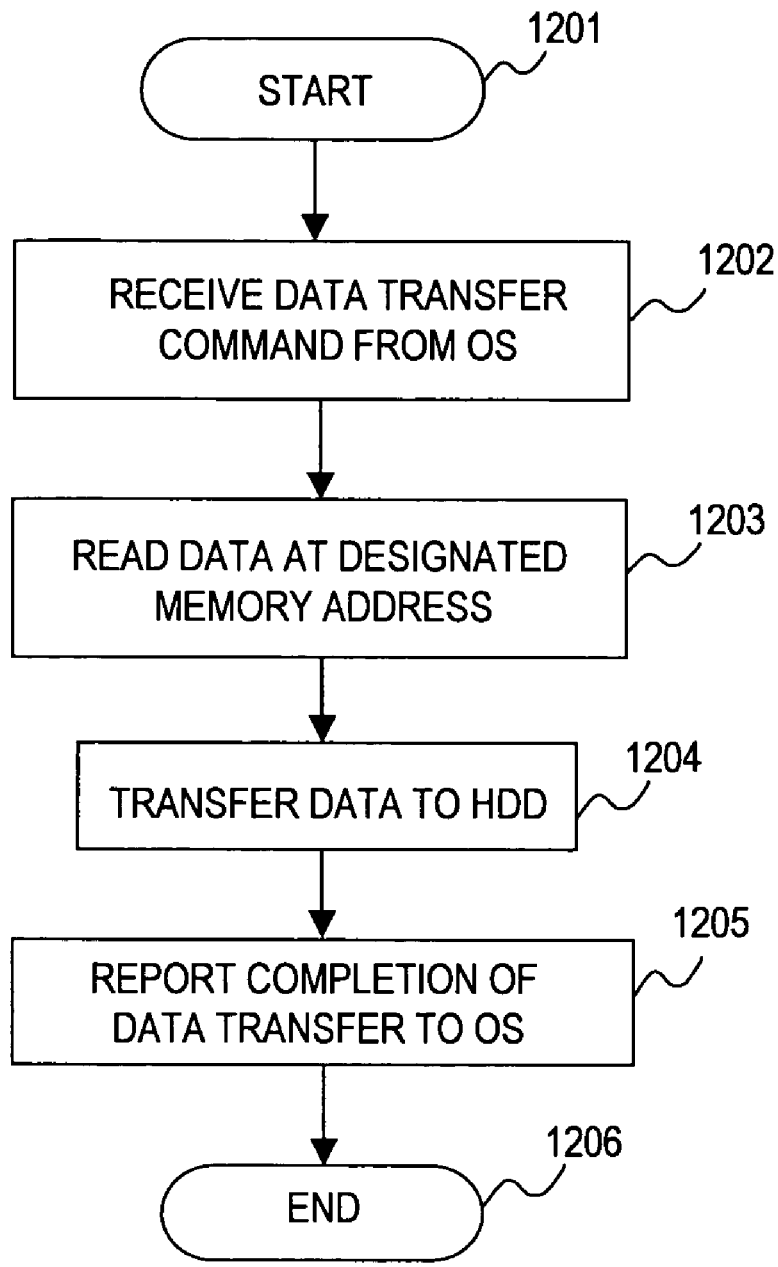
FIG. 12 is a flowchart showing processing that is executed by an HBA when data from a host computer is received via the LAN by the information apparatus according to the embodiment of this invention.

Next, the, OS 115 commands the HBA 104 to read the copied data out of the non-checking space and to transfer the read data to the HDD 103 (1108). The non-checking space in Step 1108 is an address space corresponding to a row in the table of FIG. 3 that has a value "0" in the block check character generation field 305 and a value "00" in the block check character checking field 306. Receiving the command, the HBA 104 reads the data and the block check character 801 attached to the data out of the non-checking space in the memory 102, and transfers the read data and character to the HDD 103. Read out of the non-checking space, the data and the block check character 801 are transferred to the HDD 103 without a check on the block check character 801 or generation of a new block check character as shown in Step 1007 of FIG. 10. The transferred data and the block check character are both stored in the HDD 103. When the transfer is completed, the HBA 104 sends a transfer completion report to the OS 115 as shown in FIG. 12.

The OS 115 receives the data transfer completion report from the HBA 104 (1109) and ends the processing (1110).

The description here takes as an example a case in which data of the received packet is written in Step 1103 at an address "0x00000000" inside the non-checking space 403, the data is copied in Step 1107 to an address "0x30000000" inside the block check character generation space 404, and the copied data is transferred in Step 1108 from an address "0x10000000" inside the non-checking space to the HDD 103.

What actually happens in this case is that data of the received packet is stored in Step 1103 at an address "0x00000000" within the physical address space 402. In Step 1107, the data at the address "0x00000000" in the physical address space 402 is read out, the block check character 801 is generated, and the read data along with the block check character 801 is stored at an address "0x10000000" in the physical address space 402. In Step 1108, the data and the block check character 801 at the address "0x10000000" in the physical address space 402 are read out and transferred to the HDD 103.

FIG. 12 is a flowchart showing processing that is executed in the information apparatus 100 according to the embodiment of this invention when the HBA 104 transfers data to the HDD 103.

As the processing is started (1201), the HBA 104 receives a data transfer command from the OS 115 (1202). The HBA 104 reads data at a memory address that is contained in the received data transfer command (1203). The command received in Step 1202 is the one sent in Step 1108 of FIG. 11. At this point, the system controller 109 judges, based on to which space in the address space 401 the designated address belongs, whether or not a block check character is to be generated, or whether or not a block check character is to be checked as shown in Steps 1006 to 1009 of FIG. 10.

Next, the HBA 104 transfers the read data to the HDD 103 (1204).

The HBA 104 then reports completion of the data transfer to the OS 115 (1205), and ends the processing (1206).

Figure 13:
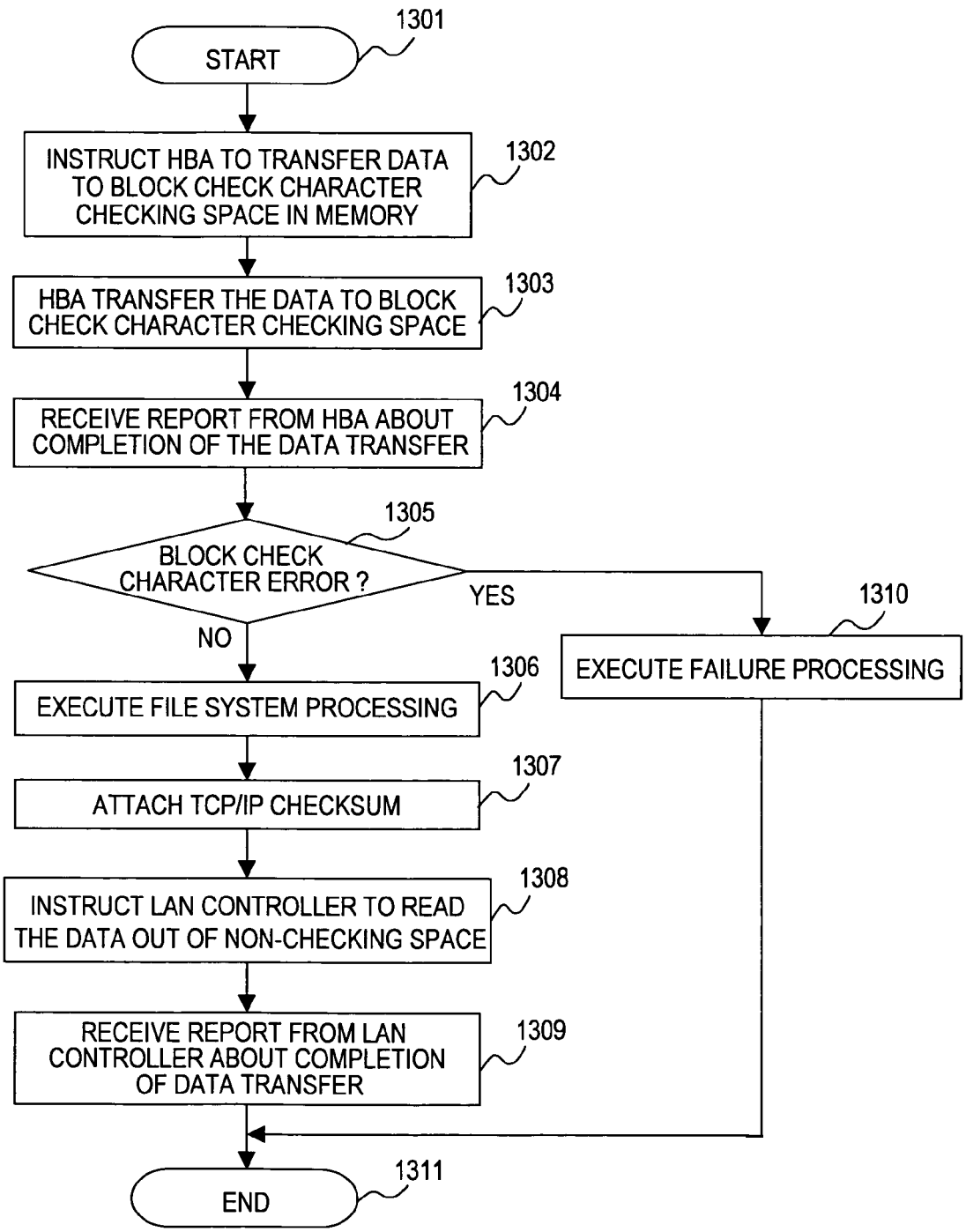
FIG. 13 is a flowchart showing processing that is executed by the OS when data is sent to a host computer via the LAN by the information apparatus according to the embodiment of this invention.

FIG. 13 is a flowchart showing processing that is executed by the OS 115 when data is read out of the HDD 103 and sent to a host computer via the LAN 105 by the information apparatus 100 according to the embodiment of this invention.

As the processing is started (1301), the OS 115 commands the HBA 104 to transfer data to the block check character checking space (character removed) 405 of the memory 102 (1302).

Receiving the command of Step 1302, the HBA 104 writes the designated data in the block check character checking space (character removed) 405 (1303). At this point, the system controller 109 checks the block check character 801 attached to the data, and then removes this block check character 801 from the data to write the data alone in the memory 102 as shown in Step 1014 of FIG. 10.

The OS 115 receives a report from the HBA 104 about completion of the data transfer (1304).

The OS 115 next judges whether or not the result of checking the block check character 801 in Step 1303 indicates the presence of error (1305).

In the case where error is detected in Step 1305, the data transferred from the HBA 104 contains error. Then the OS 115 executes failure processing (1310) and ends the transmission processing (1311). The failure processing will be described later in detail with reference to FIG. 17.

In the case where error is not detected in Step 1305, the data transferred from the HBA 104 does not contain error. Then the OS 115 executes file system processing (1306). This file system processing is reverse to the processing that is executed in Step 1106 of FIG. 11.

Next, the OS 115 attaches the TCP checksum 703 and the IP checksum 705 to the data that has received the file system processing (1307).

The OS 115 then commands the LAN controller 106 to read, out of the non-checking space, the data to which the checksums have been attached (1308). The non-checking space in Step 1308 is an address space corresponding to a row in the table of FIG. 3 that has a value "0" in the block check character generation field 305 and a value "00" in the block check character checking field 306. Receiving the command, the LAN controller 106 reads the designated data out of the non-checking space, and transfers the read data to the host computer via the LAN 105.

The OS 115 receives a data transfer completion report from the LAN controller 106 (1309) and ends the processing (1311).

Figure 14:
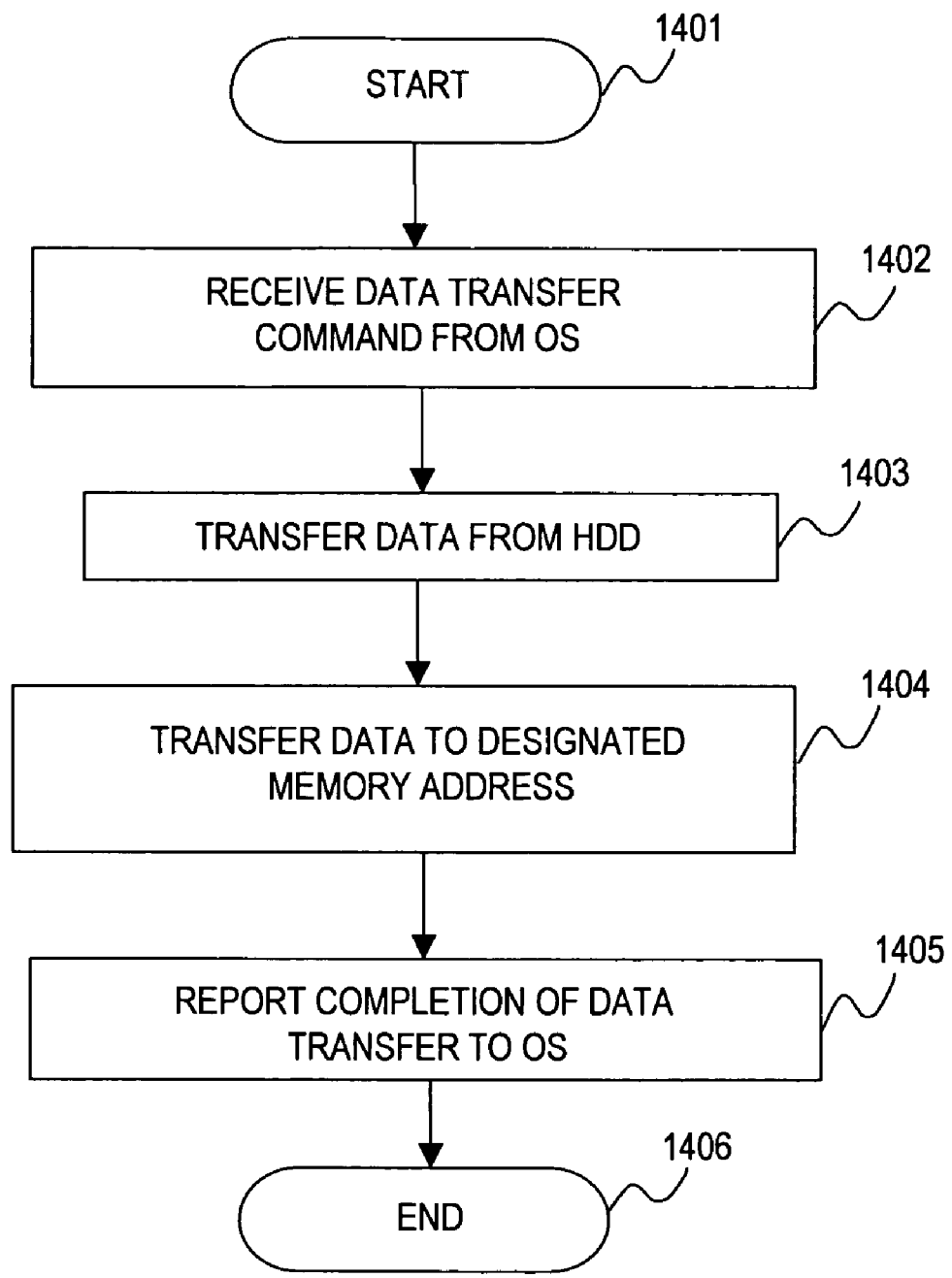
FIG. 14 is a flowchart showing processing that is executed by the HBA when data is sent to a host computer via the LAN by the information apparatus according to the embodiment of this invention.

FIG. 14 is a flowchart showing processing that is executed by the HBA 104 when data is sent to a host computer via the LAN 105 by the information apparatus 100 according to the embodiment of this invention.

As the processing is started (1401), the HBA 104 receives a data transfer command from the OS 115 (1402). The HBA 104 reads data designated by the command out of the HDD 103 (1403).

The HBA 104 transfers the read data to an address in the memory 102 that is designated by the command (1404). At this point, the system controller 109 judges, based on to which space in the address space 401 the designated address belongs, whether or not a block check character is to be generated, or whether or not a block check character is to be checked as shown in Steps 1012 to 1015 of FIG. 10.

The HBA 104 then sends a data transfer completion report to the OS 115 (1405), and ends the processing (1406).

In the above processing, the block check character 801 is attached only to data that is transferred by the HBA 104 between the memory 102 and the HDD 103 whereas the block check character 801 is not attached to data (packet) that is transferred between the information apparatus 100 and a host computer via the LAN 105. However, in the case where the host computer has the functions of generating and checking the block check character 801 according to this embodiment, this embodiment can be applied also to data transfer that is carried out over the LAN 105.

Figure 15:
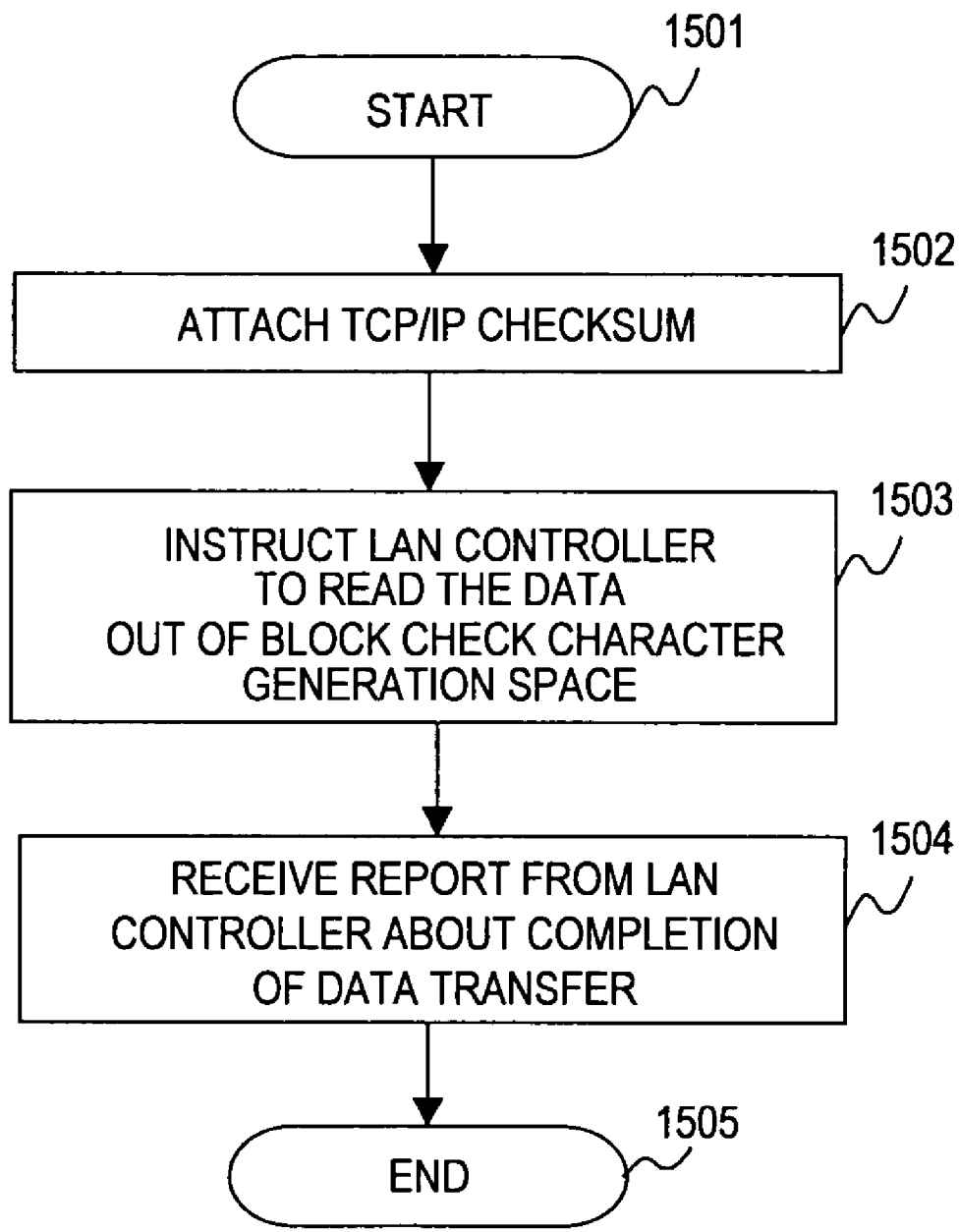
FIG. 15 is a flowchart showing processing that is executed by the OS when data with a block check character attached is sent to a host computer via the LAN by the information apparatus according to the embodiment of this invention.

FIG. 15 is a flowchart showing processing that is executed by the OS 115 when data with the block check character 801 attached is sent to a host computer via the LAN 105 by the information apparatus 100 according to the embodiment of this invention.

As the processing is started (1501), the OS 115 attaches the TCP checksum 703 and the IP checksum 705 to data stored in the memory 102 (1502).

The OS 115 commands the LAN controller 106 to read the data to which the checksums have been attached out of the block check character generation space (1503). The block check character generation space in Step 1503 is an address space corresponding to a row in the table of FIG. 3 that has a value "1" in the block check character generation field 305 and a value "00" in the block check character checking field 306 (the row is omitted from FIG. 3). The LAN controller 106 reads the designated data out of the block check character generation space. At this point, the system controller 109 generates the block check character 801 for protecting the read data, and sends out the data along with the block check character 801 over the system bus 112 as shown in Step 1008 of FIG. 10. The LAN controller 106 transfers the read data and the block check character 801 to the host computer via the LAN 105 and, upon completion of the transfer, sends a transfer completion report to the OS 115.

The OS 115 receives the transfer completion report from the LAN controller 106 (1504), and ends the processing (1505).

Figure 16:
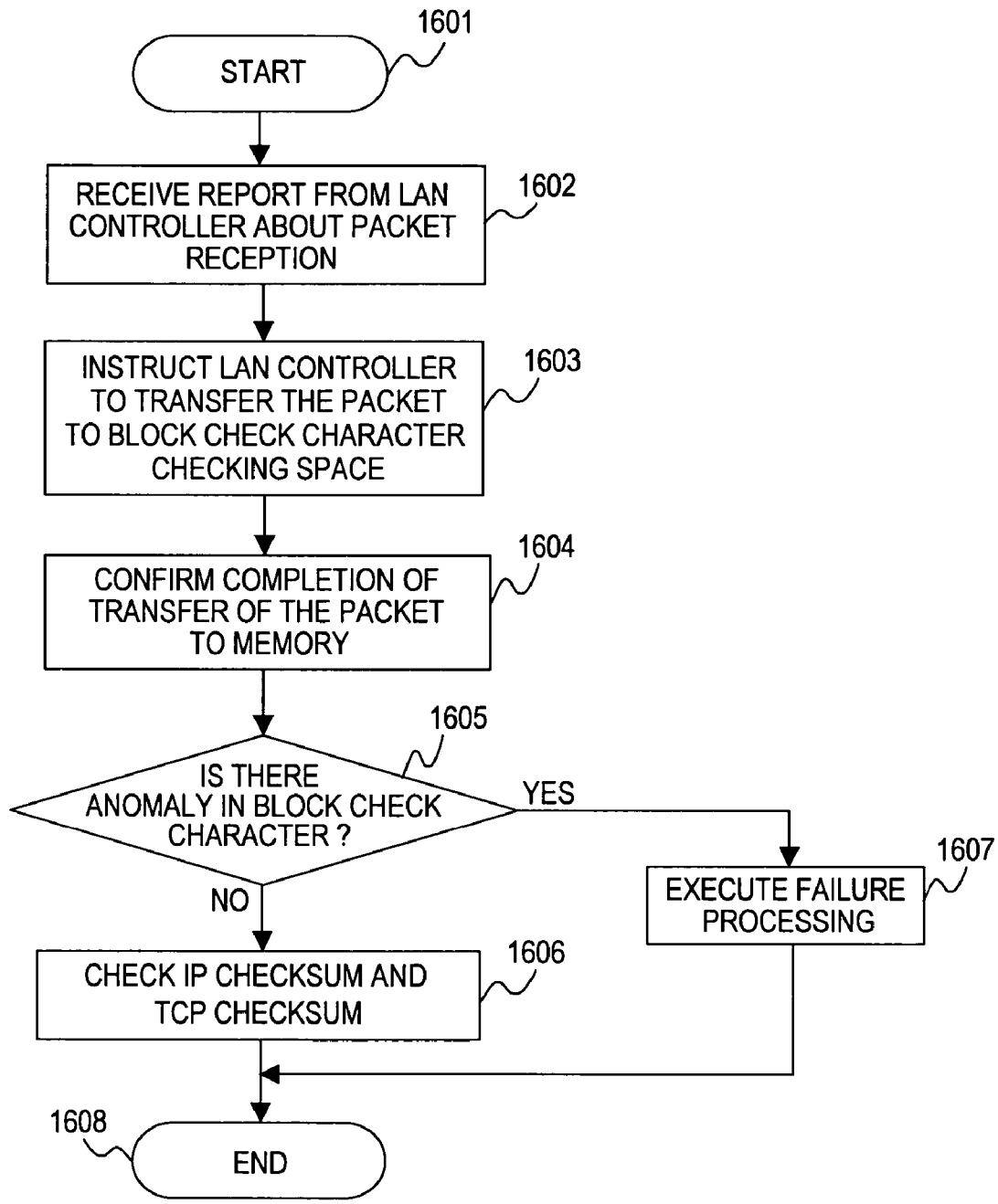
FIG. 16 is a flowchart showing processing that is executed by the OS when data with a block check character attached is received from a host computer via the LAN by the information apparatus according to the embodiment of this invention.

FIG. 16 is a flowchart showing processing that is executed by the OS 115 when data with the block check character 801 attached is received from a host computer via the LAN 105 by the information apparatus 100 according to the embodiment of this invention.

As the processing is started (1601), the OS 115 receives a report from the LAN controller 106 about the reception of a packet (1602). The OS 115 commands the LAN controller 106 to transfer the received packet to the block check character checking space (character removed) 405 of the memory 102 (1603). The LAN controller 106 writes the received packet in the block check character checking space (character removed) 405 of the memory 102. At this point, the system controller 109 checks the block check character 801 attached to the received packet, and then removes the block check character 801 from the packet to write the packet alone in the memory 102 as shown in Step 1015 of FIG. 10.

Next, the OS 115 confirms that the transfer of the received packet to the memory 102 has been completed (1604).

The OS 115 then judges whether or not the result of checking the block check character 801 in Step 1603 indicates the presence of an anomaly (1605).

In the case where an anomaly is detected in Step 1605, the received packet contains error. Then the OS 115 executes the failure processing (1607), and ends the reception processing (1608).

In the case where an anomaly is not detected in Step 1605, the received packet does not contain error. Then the OS 115 checks the IP checksum 705 and the TCP checksum 703 (1606), and ends the processing (1608).

Figure 17:
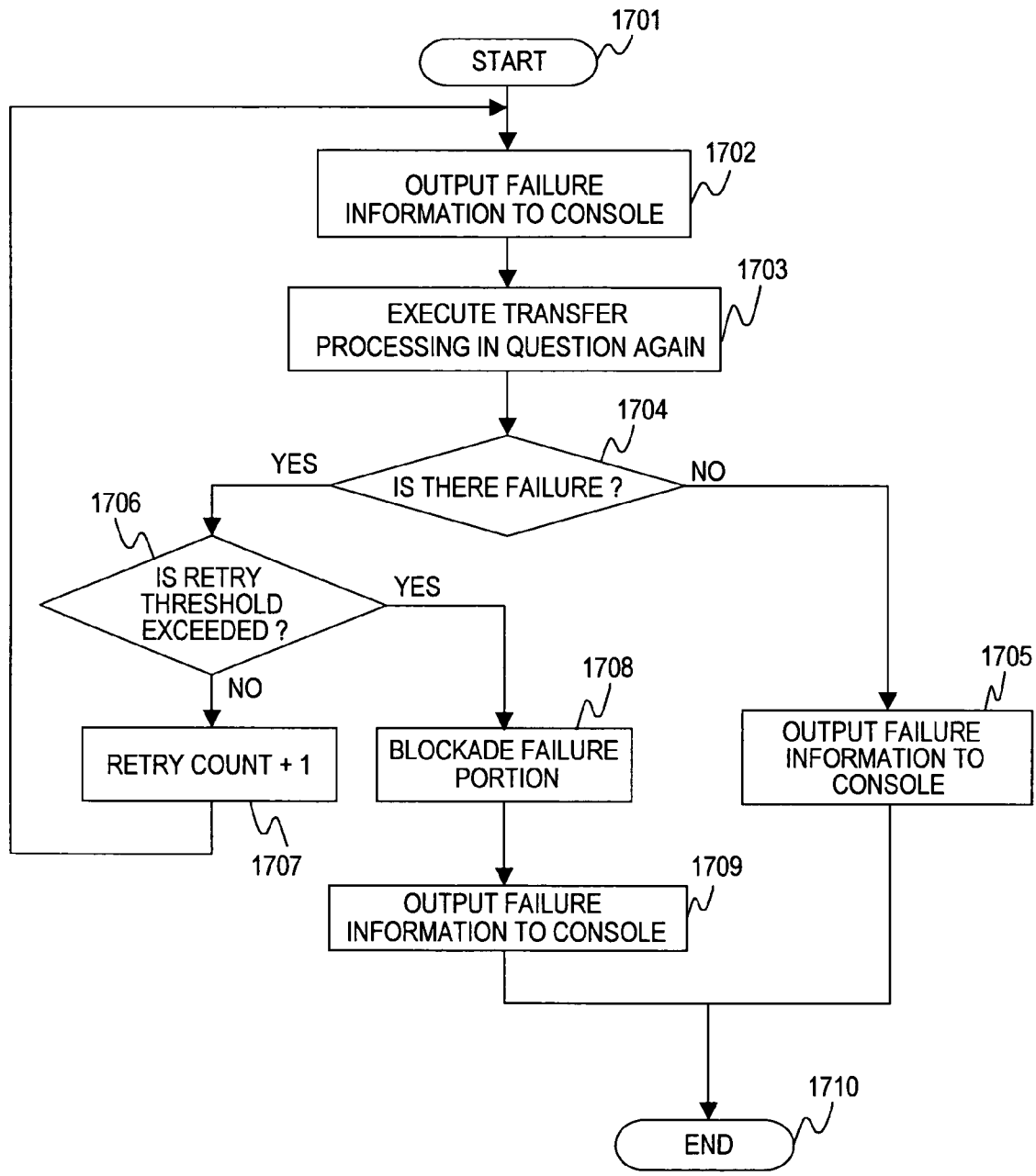
FIG. 17 is a flowchart showing failure processing which is executed by the OS according to the embodiment of this invention.

FIG. 17 is a flowchart showing the failure processing which is executed by the OS 115 according to the embodiment of this invention.

The failure processing in FIG. 17 is executed when error is detected as a result of checking the block check character 801 as shown in Step 1310 of FIG. 13 and Step 1607 of FIG. 16.

As error is detected and the failure processing is started (1701), the OS 115 outputs failure information to a console (not shown) (1702). The console is an input/output device provided in the information apparatus 100 for displaying the hardware configuration of the information apparatus 100 as well as the apparatus' state including the presence or absence of failure to a system administrator, and for enabling the system administrator to input a command to the information apparatus 100.

The OS 115 next commands the LAN controller 106 or the HBA 104 to execute again transfer processing in which the error has been detected (for example, the processing shown in FIG. 13 or FIG. 16) (1703). This is because executing transfer processing again solves error in some cases, for instance, when the error is caused by temporary disturbances such as electrical noise.

The OS 115 next judges whether or not error is detected as a result of executing the transfer processing again in Step 1703 (1704).

In the case where it is judged in Step 1704 that error is not detected, the OS 115 outputs failure information to the console (1705) and ends the failure processing (1710).

In the case where it is judged in Step 1704 that error is not detected, the OS 115 judges whether the retry count has exceeded a given retry threshold or not (1706). The retry count is the number of times Step 1703 has been executed. The OS 115 may store the retry count in a given area within the memory 102, for example. The retry threshold is a threshold of the retry count, in other words, the maximum retry count allowed. The system administrator may set a retry threshold in advance. The OS 115 may store the retry threshold in a given area within the memory 102.

When it is judged in Step 1706 that the retry count has not exceeded the retry threshold, the OS 115 increases the retry count by 1 (1707), and returns to Step 1702. In the case where it is not necessary to display failure information on the console each time transfer processing is re-executed (1702), the OS 115 may return to Step 1703 after Step 1707.

When it is judged in Step 1706 that the retry count has exceeded the retry threshold, there is a strong possibility that a permanent failure has occurred. In this case, it is desirable to stop using a portion that is considered to be the cause of the error. The OS 115 therefore blockades, as a failure portion, a portion that is relevant to the processing in which the error has occurred (1708). The OS 115 then outputs failure information to the console (1709) and ends the failure processing (1710). In the case where the information apparatus 100 fails to identify a failure portion, the information apparatus 100 displays a message to that effect on the console (not shown in the drawings) and stops running.

According to the above-described embodiment of this invention, the LAN controller 106 or the HBA 104 transfers data (to write or read the data) to or from an address in the memory 102 that is designated by the OS 115. The system controller 109 generates or checks a block check character for protecting the data in accordance with the address. As a result, the data is protected by a block check character on the way from the HBA 104 to the HDD 103 in addition to the rest of the transfer path. Since it is the system controller 109 that generates and checks a block check character, carrying out this embodiment does not increase the load on the processor 101 and lowering of the performance of an information apparatus can thus be avoided. In addition, this embodiment where data transfer is controlled by the LAN controller 106 and the HBA 104 as in prior art is highly compatible with conventional systems. Moreover, whether to generate a block check character or whether to check a block check character can be selected by selecting an address in the memory at which data is to be read or written.

What is claimed is:

1. An information apparatus, comprising:
a processor;
a processor bus to which the processor is coupled;
a memory;
a memory bus to which the memory is coupled;
a communication controller that communicates with an outside of the information apparatus;
a system bus to which the communication controller is coupled; and
a system control unit coupled to the processor bus, the memory bus, and the system bus,
wherein the system control unit controls communications between the processor, the memory, and the communication controller,
wherein the system control unit determines whether to attach, to data that is transferred between the memory and the system control unit, an error detecting code for protecting the data based on an address in the memory at which the data to be transferred is read or written, wherein each address in the memory corresponds to at least one address belonging to a plurality of address spaces managed by the system control unit, wherein the plurality of address spaces include at least a first address space and a second address space, wherein when receiving a request to write data, the system control unit determines whether to attach the error detecting code to the data by determining whether the received request is a request to write the data at an address that belongs to the first address space or is a request to write the data at an address that belongs to the second address space, wherein when it is determined that the request to write the data is at the address that belongs to the first address space, the system control unit writes the data in the memory, and wherein when it is determined that the request to write the data is at the address that belongs to the second address space, the system control unit generates the error detecting code for the data, attaches the generated error detecting code to the data, and writes the error detecting code with the data in the memory.

2. The information apparatus according to claim 1, wherein the plurality of address spaces further include a third address space, and wherein, when receiving a request to write data at an address that belongs to the third address space, the system control unit checks the error detecting code attached to the data, and writes the data in the memory.

3. The information apparatus according to claim 2, wherein, when the communication controller receives data from outside of the information apparatus, the processor selects an address at which the data is to be stored, and sends the selected address to the communication controller that has received the data, and wherein the communication controller sends, to the system control unit, a request to write the received data at the address that is received from the processor.

4. The information apparatus according to claim 3, wherein the processor selects the address based on a type of the data that the communication controller receives from outside of the information apparatus.

5. The information apparatus according to claim 3, wherein the processor selects an address that belongs to the first address space and sends the selected address to the system control unit, analyzes data that is stored at the selected address to determine what type the data is, selects a data copy destination address to which the data is to be copied based on the determined data type, and instructs the system control unit to write the data at the selected data copy destination address.

6. The information apparatus according to claim 5, further comprising:
a storage medium; and
a storage medium controller to which the storage medium is coupled,
wherein the plurality of address spaces further include a fourth address space,
wherein, when receiving a request to read data at an address that belongs to the fourth address space, the system control unit reads the data from the memory, and
wherein, when data stored at the selected address needs protection, the processor instructs the system control unit to write the data that has been stored at the selected address at an address that belongs to the second address space, and instructs the storage medium controller to read, from the fourth address space, the data written at the address that belongs to the second address space, and to transfer the read data to the storage medium.

7. The information apparatus according to claim 2, further comprising:
a storage medium; and
a storage medium controller to which the storage medium is coupled,
wherein the processor instructs the storage medium controller to write data read from the storage medium at an address that belongs to the third address space of the memory, determines a result of checking the error detecting code that is attached to the written data, and when it is determined that the written data contains an error, outputs failure information and instructs the storage medium controller to execute the data write again.

8. The information apparatus according to claim 1, wherein the communication controller sends data to which the error detecting code is attached by the system control unit to a network that is coupled to the communication controller.

9. The information apparatus according to claim 1, further comprising:
at least one storage medium; and
a storage medium controller to which the storage medium is coupled,
wherein the system control unit stores, in the memory, data that is received by the communication controller, and at least one of a second error detecting code and an error correcting code that are attached to the data by a communication protocol used in the network, removes the one of the second error detecting code and the error correcting code from the data stored in the memory, and attaches the error detecting code to the data, and
wherein the storage medium controller transfers the data and the error detecting code from the memory to storage medium.

10. A data transfer method for an information apparatus, the information apparatus comprising a processor, a memory, a communication controller that communicates with an outside of the information apparatus, and a system control unit that couples the processor, the memory, and the communication controller to control communications between the processor, the memory, and the communication controller, the data transfer method comprising:

referring, by the system control unit, an address in the memory at which the data to be transferred is read or written; and determining, by the system control unit, whether to attach, to data that is transferred between the memory and the system control unit, an error detecting code for protecting the data based on the referred address, wherein each address in the memory corresponds to at least one address belonging to a plurality of address spaces managed by the system control unit, wherein the plurality of address spaces include at least a first address space and a second address space, and wherein when receiving a request to write data, the data transfer method further comprises:

determining, by the system control unit, whether to attach the error detecting code to the data by determining whether the received request is a request to write the data at an address that belongs to the first address space, or a request to write the data at an address that belongs to the second address space;

when it is determined that the request to write the data is at the address that belongs to the first address space, writing, by the system control unit, the data in the memory;

when it is determined that the request to write the data is at the address that belongs to the second address space, generating, by the system control unit, the error detecting code for protecting the data, attaching, by the system control unit, the generated error detecting code to the data, and writing, by the system control unit, the error detecting code with the data in the memory.

11. The data transfer method according to claim 10, wherein the plurality of address spaces further include a third address space, and wherein the data transfer method further comprises:

when receiving a request to write data at an address that belongs to the third address space, checking, by the system control unit, the error detecting code attached to the data; and writing, by the system control unit, the data in the memory.

12. The data transfer method according to claim 11, further comprising:

when the communication controller receives data, selecting, by the processor, an address at which the data is to be stored;

sending, by the processor, the selected address to the communication controller that has received the data; and sending, by the communication controller, a request to write the received data at the address that is received from the processor.

13. The data transfer method according to claim 12, further comprising:

selecting, by the processor, the address based on a type of the data that the communication controller receives.

14. The data transfer method according to claim 12, further comprising:

selecting, by the processor, an address that belongs to the first address space;

sending, by the processor, the selected address to the system control unit;

analyzing, by the processor, data that is stored at the selected address to determine what type the data is;

selecting, by the processor, a data copy destination address to which the data is to be copied based on the determined data type; and instructing, by the processor, the system control unit to write the data at the selected data copy destination address.

15. The data transfer method according to claim 11, wherein the information apparatus further comprises a storage medium controller to which a storage medium is coupled, and wherein the data transfer method further comprises:

instructing, by the processor, the storage medium controller to write data read from the storage medium at an address that belongs to the third address space of the memory;

determining, by the processor, a result of checking an error detecting code that is attached to the written data; and when it is determined that the written data contains an error, outputting, by the processor, failure information and instructing, by the processor, the storage medium controller to execute the data write again.

16. The data transfer method according to claim 10, further comprising:

sending, by a communication controller coupled to a network, data to which the error detecting code is attached by the system control unit to the network.

17. The data transfer method according to claim 10, wherein the information apparatus further comprises a storage medium controller to which a storage medium is coupled, and wherein the data transfer method further comprises:

storing, by the system control unit, in the memory, data that is received by the communication controller, and at least one of a second error detecting code and an error correcting code that are attached to the data by a communication protocol used in the network;

removing, by the system control unit, the at least one of the second error detecting code and the error correcting code from the data stored in the memory, and attaching, by the system control unit, the error detecting code to the data; and transferring, by the communication controller, the data and the error detecting code from the memory to the storage medium.

* * * * *